(No Model.)
P. M. MISHLER.
HEDGE.
No. 410,914. Patented Sept. 10, 1889.
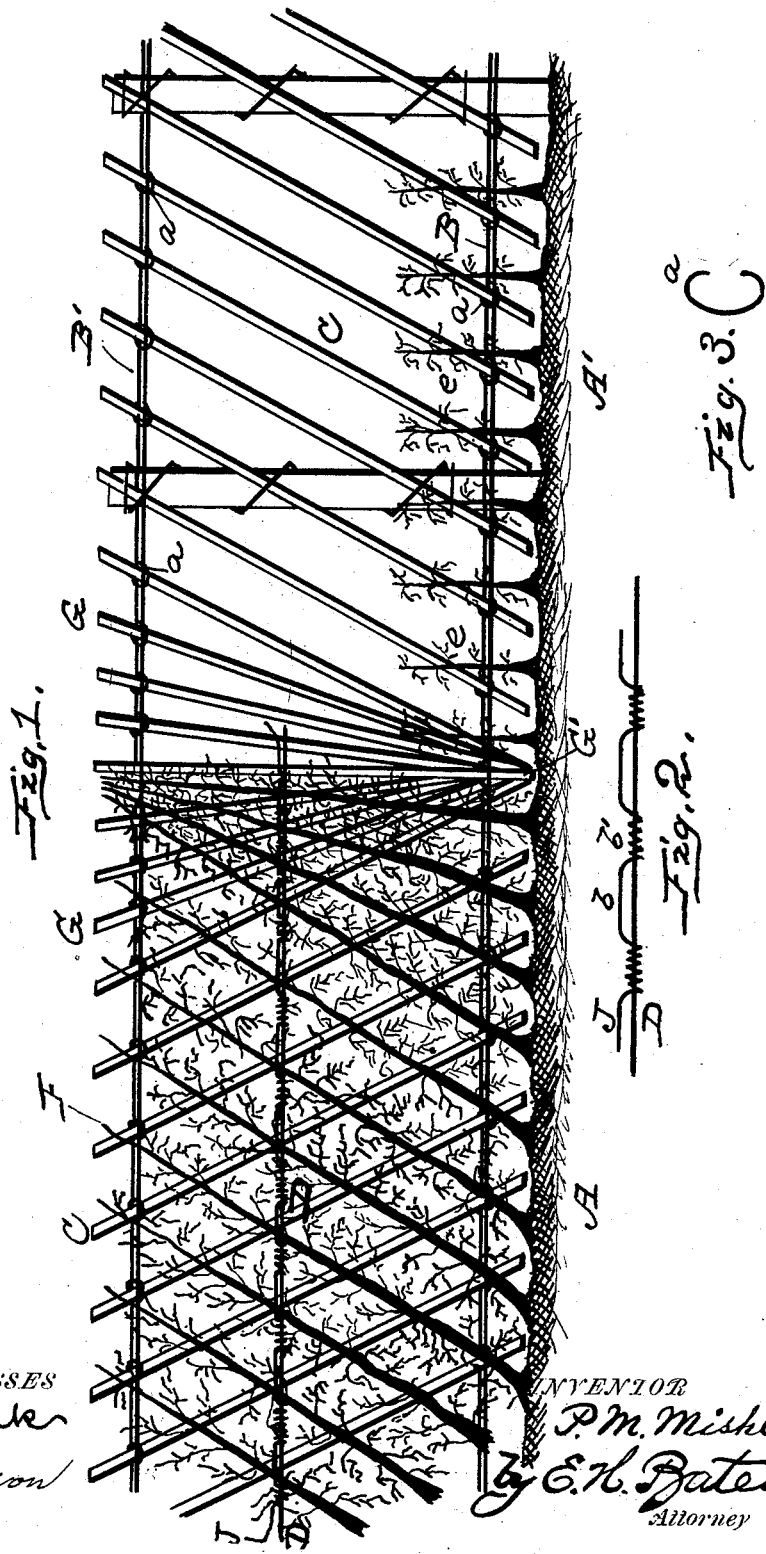
WITNESSES
Jas. B. Clark
S. S. Thompson
INVENTOR
P. M. Mishler
by E. H. Bates
Attorney

UNITED STATES PATENT OFFICE.

PHARES M. MISHLER, OF HAGERSTOWN, MARYLAND.

HEDGE.

SPECIFICATION forming part of Letters Patent No. 410,914, dated September 10, 1889.

Application filed June 29, 1889. Serial No. 316,018. (No model.)

*To all whom it may concern:*

Be it known that I, PHARES M. MISHLER, a citizen of the United States, residing at Hagerstown, in the county of Washington and State of Maryland, have invented certain new and useful Improvements in Hedges; and I do hereby declare the following to be a full, clear, and exact description of the invention, such as will enable others skilled in the art to which it appertains to make and use the same.

My invention relates to improvements in what are known as "hedges" or "living fences," which are usually made of the osage-orange plant; and the objects of my invention are, first, to provide a rack or main support for such a fence which shall be substantial and especially adapted for training the live plants and stalks, and forming, in combination therewith, a good, strong, impenetrable fence from the start, and, second, to provide a fence which is composed, in part, of poles cut in the rough, strong living stalks, rail-wires, and posts, and certain clamping and wire binding or holding devices, whereby, when the young plants are trained upon the fence and attain the proper age and strength, the poles and posts can be removed, (at that time more or less decayed and useless,) leaving a solid living or growing fence, which will possess great strength, and when properly trimmed will present a very handsome and beautiful appearance. I attain these objects by the means illustrated in the accompanying drawings, in which—

Figure 1 represents an elevation of one side of my improved fence, one panel or section of which is partly finished and the other section finished. Fig. 2 is a detail view of part of the middle wire and the wire-binding loops for the inclined stalks, and Fig. 3 shows one of the metal binding-clamps used for securing the poles to the top and bottom horizontal wires.

Similar letters refer to similar parts throughout the several views.

Referring to the annexed drawings by letter, A designates a finished panel or section of my improved fence, and A' represents a section which is unfinished.

In the process of constructing my fence I first set posts E E at suitable distances apart and employ upper and lower horizontal rail-wires B B', which are strained and held under proper tension by any suitable well-known means. I now take what are known as "hoop-poles" C, which are used in the rough, and preferably of an even length, and secure them to the top and bottom wires B B' by means of the C-shaped clamps $a$. The said poles start from a vertical central pole, and are gradually inclined on either side thereof until an angle of about forty-five degrees is reached, when the poles are arranged parallel to each other for any desired distance. I thus form at predetermined parts of the fence a compound triangular brace, (indicated by G G' G,) which will effectually prevent the fence-wires and the parts which they support from sagging, and the same are secured to the post by the tying-wires, as shown. The next step is to select the stalks or plants, which plants should be in a condition to take root and grow. The osage-orange plant is preferred for this purpose, being of quick growth and in every way adapted for this purpose. They are planted in the ground at suitable distances apart— say about the same distances apart as the poles C, which latter need not be driven in the ground, as they are merely temporary supports and elements of the growing fence. These living stalks are inclined in a reverse direction to the poles, and the arrangement of them to form a bracing triangular section is the same as that for the poles, with this exception, that the apex of the triangle for the stalks F is up while the apex of the triangle of the poles is down, as clearly shown in Fig. 1 of the annexed drawings. The next step is to plant young growing twigs of the osage-orange or other suitable plant at suitable distances apart, as indicated at $e$, and directly, or nearly so, beneath the line-wires; or they may be planted on one side or both sides of the poles, and when sufficiently high they are plashed or woven in with the poles or left to grow on one side of said poles, as may be desired, as shown on the left-hand side of Fig. 1, thus filling up the angular interstices formed by the poles and stalks, and in course of time serving, in combination with the growing stalks, to form a solid impenetrable fence. The next step is to loosely bind these stalks in an inclined position, which is done by means of a binding-wire J, wound around the intermediate line-wire D, as at $b'$, and then looped about the latter, as at $b$, after passing around the stalk, thus forming a series of ties throughout the entire line of fence.

When the dead poles C have become useless, they can be removed, if desired, from the other parts of the fence, the posts likewise leaving a living fence, which may be trimmed to present a very beautiful ornamental appearance, and which will be self-supporting even when the wires, poles, and posts have decayed, and when thus planted the plow can be run very close to the line of fence in cultivating the young plants, thereby saving a great deal of ground which would be otherwise wasted, and a fence as herein described is durable, ornamental, and cheap to construct.

Having thus described my invention, what I claim, and desire to secure by Letters Patent, is—

A hedge fence comprising, in combination, first, a series of posts and horizontal wires secured thereto; second, series of poles inclined as shown and secured to the top and bottom horizontal wires by means of clamps, said poles arranged at certain points to form compound angular braces, and, third, a series of oppositely-inclined growing stalks planted in the ground and secured to the central horizontal wire by means of the loops $b$, all as shown and described.

In testimony whereof I affix my signature in presence of two witnesses.

PHARES M. MISHLER.

Witnesses:
M. S. WURNER,
HARRY BRINING.